(No Model.)
E. RATHGEB.
MECHANICAL FLY TRAP.
No. 481,820. Patented Aug. 30, 1892.
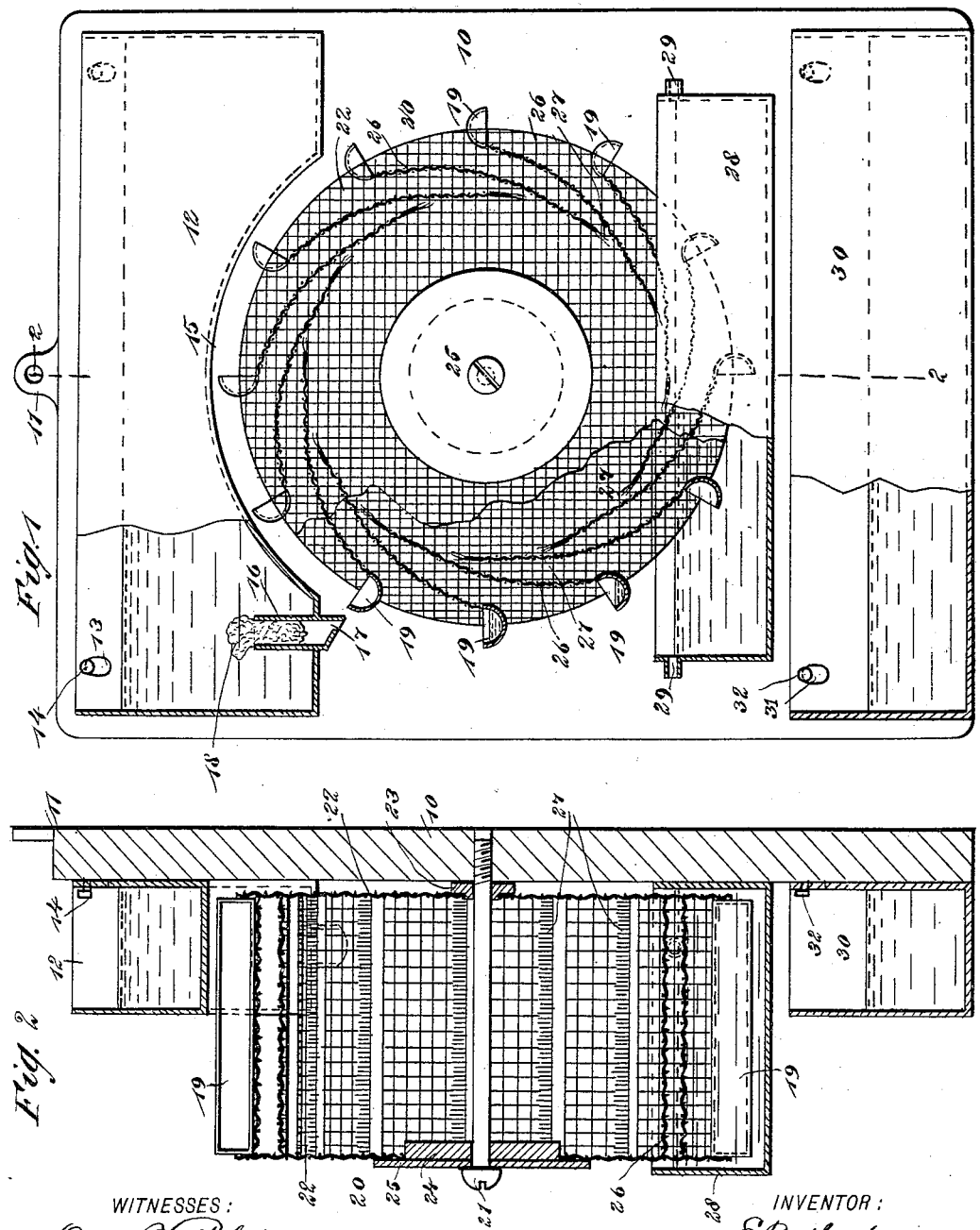
WITNESSES:
Donn Twitchell
C. Sedgwick
INVENTOR:
E. Rathgeb
BY
Munn & Co
ATTORNEYS

UNITED STATES PATENT OFFICE.

EMIL RATHGEB, OF NEW YORK, N. Y.

MECHANICAL FLY-TRAP.

SPECIFICATION forming part of Letters Patent No. 481,820, dated August 30, 1892.

Application filed December 26, 1891. Serial No. 416,251. (No model.)

*To all whom it may concern:*

Be it known that I, EMIL RATHGEB, of New York, in the county and State of New York, have invented a new and Improved Mechanical Fly-Trap, of which the following is a full, clear, and exact description.

My invention relates to improvements in fly-traps; and the object of my invention is to produce a simple mechanical apparatus which will rapidly catch flies and which will operate constantly with but little attention.

To this end my invention consists in a mechanical fly-trap, the construction of which will be hereinafter described and claimed.

Reference is to be had to the accompanying drawings, forming a part of this specification, in which similar figures of reference indicate corresponding parts in both the views.

Figure 1 is a broken front elevation of a fly-trap embodying my invention, and Fig. 2 is a vertical section of the same on the line 2 2 in Fig. 1.

The fly-trap is provided with a base-board 10, which has centrally on its upper edge a perforated ear 11, by means of which it may be suspended upon the wall, and on the front side of the board, near the top, is a reservoir 12, which is open at the top and which has in its back wall, near the upper edge, slots 13, which are adapted to receive hooks or pins 14, which project from the front of the board 10, and which thus serve to suspend the reservoir. The reservoir 12 is curved or concaved in the center, as shown at 15 in Fig. 1, to provide for the movement of the water-wheel below it, and near one end of the reservoir is an outlet-pipe 16, which extends downward through the reservoir-bottom and is provided with a small vent 17 and is closed by porous felt, sponge, or similar material 18, which permits the liquid in the reservoir to drip slowly through the pipe. The pipe 16 is arranged to deliver into the buckets 19 of a water-wheel 20, which buckets are arranged so as to come successively beneath the pipe, and the water-wheel, which is made almost entirely of wire screening or similar light material, is pivoted on a screw 21, which is screwed into the board 10, and the wire ends 22 of the water-wheel have central hubs 23 and 24, which revolve on the screw 21, and the outer end of the water-wheel is provided with a large washer 25, which turns next to the screw-head. The buckets 19 extend across the face of the water-wheel, and they are supported on screen-wire arms 26, which arms are secured to the end walls of the water-wheel and project tangentially inward, the arms terminating at their inner ends in brushes 27, which may be of linen or other light material, as the brushes should be limber enough to permit a fly to pass inward over them, but stiff enough to prevent the return of the fly. The arms are arranged so that they converge inward, as is best shown in Fig. 1, and in this way the fly will easily enter between two arms and will be gradually forced inward to the interior of the wheel, which wheel serves as a trap or cage. The water-wheel is turned by the drops which fall from the pipe 16, and the lower portion of the wheel is held to turn in a tank 28, which receives the water or other liquid from the buckets and which is fixed to the board 10. The tank 28 has end outlets 29 near the top, which outlets are placed in relation to the water-wheel so that the liquid in the tank 28 will rise high enough to nearly but not quite submerge the inner ends of the arms 26, and when the arms are turned down into the liquid in the tank the flies between them to escape drowning will rush upward into the interior of the wheel.

On the lower portion of the board 10 is another tank 30, which is larger than the tank 28 and is provided with slots 31 in the back wall, near the top, by means of which it may be hung upon pins or hooks 32 on the board 10.

The operation of the trap is as follows: The reservoir 12 is filled with sweetened water, which serves as bait, and the porous stopper 18 is adjusted in the outlet-pipe 16, so that the sweetened water will drip slowly through the pipe and fall upon the buckets 19 of the water-wheel. This will cause the water-wheel to revolve, and as it turns slowly around the flies will light upon the buckets to drink the sweetened water, and as the buckets descend into the tank 28 the flies rise from the bucket nearest the tank, but are caught by the bucket above them, so that the flies crawl upward between two of the arms 26, and finally to escape being drowned in the tank 28 they crawl past the brushes 27 and are caught within the trap. The washer 25 and hub 24 are removable, and when the trap or wheel has been filled with flies they are removed through the end opening, closed by the hub and washer. When the reservoir 12 has been exhausted, the sweetened water which has been caught in the tank 30 is poured from the said tank into the reservoir and used over again.

Having thus fully described my invention, I claim as new and desire to secure by Letters Patent—

1. In a fly-trap, a hollow wheel provided with buckets on its periphery and with tangential passages leading from the periphery between the buckets to the interior of the same, as specified.

2. In a fly-trap, the combination, with a liquid-containing tank, of a hollow revolving wheel mounted to turn in said tank and provided with tangential passages leading from the periphery to the interior of the wheel, substantially as and for the purpose set forth.

3. A fly-trap comprising a hollow wheel provided with buckets on its periphery and with tangential passages between the buckets and leading from the periphery of the wheel to the interior of the same and a reservoir above the wheel and discharging into the buckets thereof, substantially as described.

4. A mechanical fly-trap comprising a water-wheel held to turn in a liquid-containing tank, said water-wheel having face-buckets with inwardly-extending arms, and a reservoir mounted above the wheel and having an outlet-pipe adapted to deliver upon the buckets, substantially as described.

5. A mechanical fly-trap comprising a hollow water-wheel having face-buckets with inwardly-extending arms which terminate in brushes and a reservoir mounted adjacent to the wheel and having an outlet-pipe to deliver upon the buckets, substantially as described.

6. A mechanical fly-trap comprising a base-board, a hollow water-wheel held to turn on the base-board and provided with face-buckets having inwardly-extending arms, a reservoir mounted above the wheel and having an outlet-pipe to deliver upon the buckets, a liquid-holding tank held to receive the lower portion of the wheel and having end outlets, and a main receiving-tank arranged beneath the wheel-tank, substantially as described.

7. The combination, with a water-wheel having face-buckets and inwardly-extending arms, of a reservoir mounted above the wheel, said reservoir having a concave middle portion to fit over the wheel and an outlet-pipe to deliver upon the buckets, substantially as described.

EMIL RATHGEB.

Witnesses:
THEODORE URBAN,
CHARLES HOFFMANN.